United States Patent [19]

Tazi et al.

[11] Patent Number: 5,064,897

[45] Date of Patent: Nov. 12, 1991

[54] PROCESS FOR MAKING ETHANOL SOLUTIONS OF ALKYL HALF-ESTERS OF COPOLYMERS OF MALEIC ANHYDRIDE AND A $C_1$-$C_4$ ALKYL VINYL ETHER

[75] Inventors: Mohammed Tazi, Wayne; Robert B. Login, Oakland, both of N.J.

[73] Assignee: ISP Investments Inc., Wilmington, Del.

[21] Appl. No.: 574,843

[22] Filed: Aug. 30, 1990

[51] Int. Cl.$^5$ .................... C08K 5/05; C08F 222/16; C08F 216/12

[52] U.S. Cl. .................................. 524/765; 526/318; 526/332

[58] Field of Search .................. 524/765; 526/318

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

What is described herein is a process for making ethanol solutions of alkyl half-esters of copolymers of maleic anhydride and a $C_1$-$C_4$ alkyl vinyl ether which are benzene and acetone-free. The invention is characterized by (a) precharging a reactor with excess $C_1$-$C_4$ alkyl vinyl ether as both monomer reactant and solvent, and a free radical polymerization initiator, at a reaction temperature; (b) feeding the alkyl half-ester of maleic anhydride formed by reaction of substantially one mole of maleic anhydride and substantially one mole of alkanol into the precharged reactor to form the desired alkyl half-ester of the alternating copolymer of maleic anhydride and the $C_1$-$C_4$ alkyl vinyl ether in excess alkyl vinyl ether as solvent; (c) cooling the reactor to room temperature; and (d) introducing ethanol solvent into the reactor and removing excess alkyl vinyl ether to form the desired half-ester copolymer in ethanol solution.

8 Claims, No Drawings

PROCESS FOR MAKING ETHANOL SOLUTIONS OF ALKYL HALF-ESTERS OF COPOLYMERS OF MALEIC ANHYDRIDE AND A $C_1$-$C_4$ ALKYL VINYL ETHER

BACKGROUND OF THE INVENTION

1. Field of the Invention

This invention relates to ethanol solutions of alkyl half-esters of maleic anhydride and a $C_1$-$C_4$ alkyl vinyl ether, and, more particularly, to a process for making such solutions which are benzene and acetone-free.

2. Description of the Prior Art

Several processes are available for making ethanol solutions of alkyl, e.g. butyl half-esters of maleic anhydride and a $C_1$-$C_4$ alkyl vinyl ether. For example, such solutions can be obtained from powders of maleic acid-$C_1$-$C_4$ alkyl vinyl ether copolymers prepared by copolymerization of maleic anhydride and a $C_1$-$C_4$ alkyl vinyl ether in benzene. In this process, such powders are half-esterified in excess butanol, followed by introduction of ethanol solvent and removal of remaining butanol. However, since this method requires the use of a considerable excess of butanol, some butanol may remain in the product. Furthermore, the half-ester must be heated to distill out excess butanol, and, under these conditions, a considerable amount of the corresponding ethyl half-ester copolymer is formed by transesterification of the half-butanol copolymer solution. In summary, the presence of undesirable benzene, butanol and ethyl half-ester in the solution product is objectionable from a commercial standpoint.

Another method known in the art avoids the use of benzene but introduces acetone as a solvent into the system. Residual acetone, free butanol and ethyl half-ester copolymer are found in the solution of this product. These solvents also are objectionable in commercial compositions, such as hair formulations. Furthermore the ethyl half-ester copolymer is less compatible with hydrocarbon propellants used in aerosol hair treatment products than the butyl half-ester copolymer.

For these and other reasons, it is desired to provide a new and improved process for making ethanol solutions of alkyl half-esters of copolymers of maleic anhydride and a $C_1$-$C_4$ alkyl vinyl ether, which process overcomes the disadvantages of prior art methods of manufacturing such products.

Accordingly, it is an object of the present invention to provide a process for making ethanol solutions of alkyl, e.g. butyl half-esters of copolymers of maleic anhydride and a $C_1$-$C_4$ alkyl vinyl ether in which residual amounts of solvents such as benzene and acetone are absent, and butanol solvent and ethyl half-ester copolymer by-product are minimized.

These and other objects and features of the invention will be made apparent from the following description of the invention.

SUMMARY OF THE INVENTION

What is described herein is a process for making ethanol solutions of alkyl, e.g. butyl half-esters of copolymers of maleic anhydride and a $C_1$-$C_4$ alkyl vinyl ether which are benzene and acetone-free. The invention is characterized by (a) precharging a reactor with excess $C_1$-$C_4$ alkyl vinyl ether as both monomer reactant and solvent, and a free radical polymerization initiator, at a reaction temperature; (b) feeding the alkyl, e.g. butyl half-ester of maleic anhydride formed by reaction of substantially one mole of maleic anhydride and substantially one mole of butanol into the precharged reactor to form the desired alkyl half-ester of the alternating copolymer of maleic anhydride and the $C_1$-$C_4$ alkyl vinyl ether in excess alkyl vinyl ether as solvent; (c) cooling the reaction product to room temperature; and (d) introducing ethanol solvent into the reactor and removing excess alkyl vinyl ether, thereby to form the desired ethanol solution of the alkyl half-ester copolymer.

DETAILED DESCRIPTION OF THE INVENTION

In accordance with the present invention, there is provided a process for making ethanol solutions of alkyl, e.g. lower alkyls such as butyl half-esters of copolymers of maleic anhydride and a $C_1$-$C_4$ alkyl vinyl ether which are benzene and acetone-free. In this method, a suitable reactor is provided with appropriate inlet tubes, agitation means, and heater and temperature control means. The reactor is first purged with nitrogen to remove air from the system. Generally three separate purges are employed, at about 3 bars pressure and about 40° C. Then the reactor is precharged with a substantial excess of $C_1$-$C_4$ alkyl vinyl ether reactant, preferably methyl vinyl ether, which also functions as a solvent to facilitate agitation of the contents of the reactor before and during the polymerization. The solvent then is heated to a reaction temperature, generally about 50°-90° C., preferably about 58°-65° C. Thereafter a polymerization initiator is charged into the reactor, suitably in a solution with some alkyl vinyl ether solvent. Any suitable initiator known in the art may be used including but not limited to peroxides. Tertiary butyl or tertiary amylperoxy pivalate are preferred. The concentration of initiator may vary widely, suitably about 0.05 to 2% by weight of maleic anhydride is used, although about 0.2% by weight usually will suffice for carrying out an effective polymerization.

The first step in the process of the invention is the preparation of the alkyl, e.g. butyl half-ester of maleic anhydride (BMA). This monomer is made by direct half-esterification of one mole of maleic anhydride and one mole of butanol at about 80° C. for 3-4 hours. This reaction consumes all of the butanol reactant.

The BMA monomer then is copolymerized with the $C_1$-$C_4$ alkyl vinyl ether reactant by feeding the liquid half-ester into the precharged reactor. Generally about one mole of BMA is copolymerized with about 6-10 moles of alkyl vinyl ether, preferably methyl vinyl ether, at about a 20% solids level. The product is an alternating copolymer of alkyl vinyl ether and BMA, which is the desired butyl half-ester of maleic anhydride and alkyl vinyl ether, in excess alkyl vinyl ether only.

Thereafter the reactor is cooled to room temperature, and ethanol is introduced while excess methyl vinyl ether is vented (b.p. 5° C.), thereby forming an ethanol solution of the butyl half-ester as a 50% solids solution. Since removal of the methyl vinyl ether occurs below room temperature and solvent exchange of ethanol for methyl vinyl ether is carried out at room temperature, transesterification of ethanol with BMA to form the ethyl half-ester does not occur. In addition, no extraneous benzene or acetone solvent is present in the final product, and excess butanol or substantial amounts of ethyl half-ester are not present.

The invention will now be described by reference to the following example.

EXAMPLE

A reactor equipped with suitable inlet tubes and agitation means and temperature controllers was purged with $N_2$ at 3 bars pressure and 40° C. The purged reactor then was precharged with 180.5 g. of methyl vinyl ether and heated to 60°–65° C. Then 2.7 g. of a 75% solution of tertiary amylperoxy pivalate was added. Then 86 g. of monobutyl maleate, i.e. the half-butyl ester of maleic anhydride, prepared by reacting one mole of butanol with one mole of maleic anhydride at 80° C. for 3–4 hours, was added over a 3 hour period while agitating the mixture (20% solids). The reaction product was held for 1 hour at 60° C. and the reactor was cooled to 25°–30° C. Then excess methyl vinyl ether was vented slowly while adding ethanol to form a 50% solids solution of the butyl half-ester copolymer in ethanol.

What is claimed is:

1. A process for making ethanol solutions of alkyl half-esters of copolymers of maleic anhydride and a $C_1$–$C_4$ alkyl vinyl ether which comprises:
   (a) precharging a reactor with excess $C_1$–$C_4$ alkyl vinyl ether as both monomer reactant and solvent and a free radical polymerization initiator at a reaction temperature of about 50°–90° C.,
   (b) feeding the alkyl half-ester of maleic anhydride formed by reaction of substantially one mole of maleic anhydride and substantially one mole of alkanol into the precharged reactor to form the desired alkyl half-ester copolymer reaction product,
   (c) cooling the reaction product to room temperature, and
   (d) introducing ethanol into the reactor and removing excess alkyl vinyl ether to form the desired ethanol solution of the alkyl half-ester copolymer.

2. A process according to claim 1 wherein said $C_1$–$C_4$ alkyl vinyl ether is methyl vinyl ether.

3. A process according to claim 1 wherein said desired product is benzene and acetone-free and is substantially alkanol and ethyl half-ester copolymer-free.

4. A process according to claim 1 wherein said alkanol is butanol.

5. A process according to claim 1 wherein the polymerization temperature is about 58°–65° C.

6. A process according to claim 1 wherein the copolymerization is carried out with about one mole of the butyl half-ester of maleic anhydride to about 6–10 moles of methyl vinyl ether.

7. A process according to claim 1 wherein the reaction product is about a 20% solids solution in excess alkyl vinyl ether.

8. A process according to claim 1 wherein the solution product has about 50% solids therein.

* * * * *